(12) United States Patent
Jalaldeen

(10) Patent No.: US 9,069,560 B2
(45) Date of Patent: Jun. 30, 2015

(54) OPERATIONAL MODEL CREATION FROM SOA SOLUTION ARCHITECTURE

(75) Inventor: Ahamed Jalaldeen, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 603 days.

(21) Appl. No.: 13/272,006

(22) Filed: Oct. 12, 2011

(65) Prior Publication Data

US 2013/0097579 A1    Apr. 18, 2013

(51) Int. Cl.
*G06F 9/44* (2006.01)

(52) U.S. Cl.
CPC ........................................ *G06F 8/35* (2013.01)

(58) Field of Classification Search
None
See application file for complete search history.

(56) References Cited

U.S. PATENT DOCUMENTS

| | | | |
|---|---|---|---|
| 2006/0036687 A1* | 2/2006 | Wood et al. | 709/204 |
| 2007/0203740 A1* | 8/2007 | Abu El Ata et al. | 705/1 |
| 2008/0028365 A1* | 1/2008 | Erl | 717/105 |
| 2008/0065466 A1* | 3/2008 | Liu et al. | 705/10 |
| 2008/0103786 A1* | 5/2008 | Zhang et al. | 705/1 |
| 2008/0243629 A1* | 10/2008 | Chang et al. | 705/26 |
| 2009/0112668 A1* | 4/2009 | Abu El Ata | 705/7 |
| 2009/0138293 A1* | 5/2009 | Lane et al. | 705/7 |
| 2010/0037201 A1 | 2/2010 | Salle et al. | |
| 2010/0146479 A1 | 6/2010 | Arsanjani et al. | |
| 2010/0250297 A1 | 9/2010 | Channabasavaiah et al. | |
| 2010/0250326 A1 | 9/2010 | Channabasavaiah et al. | |
| 2010/0325606 A1* | 12/2010 | Sundararajan et al. | 717/105 |
| 2011/0004862 A1 | 1/2011 | Kejriwal | |
| 2011/0054962 A1 | 3/2011 | Xu et al. | |
| 2012/0151402 A1* | 6/2012 | Durham et al. | 715/772 |

FOREIGN PATENT DOCUMENTS

| | | |
|---|---|---|
| CN | 102004947 A | 4/2011 |
| CN | 102111910 A | 6/2011 |

OTHER PUBLICATIONS

"BP win Analyze, Communicate, and Improve Complex Business Processes", BPwin brochure, pp. 1-5, [Retrrieved on Jun. 29, 2011], Retrieved from the Internet: <URL://druyanov.tripod.com/RDBMS/BPWin.html>.

(Continued)

*Primary Examiner* — Lewis A Bullock, Jr.
*Assistant Examiner* — Christine Dang
(74) *Attorney, Agent, or Firm* — Law Offices of Ira D. Blecker, P.C.

(57) ABSTRACT

A method for creation of an operational model from a service oriented architecture (SOA) solution architecture. The method includes: selecting an SOA solution architecture model from a plurality of SOA solution architecture models including a plurality of layers; retrieving at least one layer according to the SOA solution architecture model; retrieving at least one SOA model element corresponding to the at least one layer; searching for an operational model element type for the at least one SOA model element and reading the operational model element type; reading a technical environment including hardware, operating system and software product requirements for the operational model element type; creating an operational model element with the technical environment hardware, operating system and software product requirements; and generating an operational model including the specific hardware and software infrastructure required to deploy the SOA solution architecture solution. The method is performed on one or more computing devices.

14 Claims, 3 Drawing Sheets

(56) References Cited

OTHER PUBLICATIONS

Niemann et al., "Towards a Generic Governance Model for Service-oriented Architectures", Proceedings of the Fourteenth Americas Conference on Information Systems, Toronto, ON, Canada Aug. 14-17, 2008, pp. 1-10.

J. L. C. Sanz et al., "Business Services as a New Operational Model for Enterprises and Ecosystems", Proceedings of the 8th IEEE International Conference on E-Commerce Technology and the 3rd IEEE International Conference on Enterprise Computing, E-Commerce, and E-Services (CEC/EEE'06), pp. 1-5.

Christian Schröpfer et al., "Introducing a method to derive an enterprise-specific SOA operating model", 12th International IEEE Enterprise Distributed Object Computing Conference, 2008, pp. 1-10.

\* cited by examiner

| SOA SOLUTION ARCHITECTURE LAYER | SOA MODEL ELEMENT | OPERATIONAL MODEL ELEMENT |
|---|---|---|
| 5 - CONSUMER LAYER | SERVICE CONSUMER | WEB BROWSER |
| 4 - BUSINESS PROCESS LAYER | DOMAIN | NOT APPLICABLE |
| | FUNCTIONAL AREA | NOT APPLICABLE |
| | FUNCTION | NOT APPLICABLE |
| | PROCESS, SUB-PROCESS | PROCESS ENGINE |
| | TASK | NOT APPLICABLE |
| 3 - SERVICES LAYER | CANDIDATE SERVICE | NOT APPLICABLE |
| | SERVICE | WEB SERVICES CONTAINER |
| | COMPOSITE SERVICE | WEB SERVICES CONTAINER |
| | SERVICE HIERARCHY | NOT APPLICABLE |
| | SERVICE CATEGORY | NOT APPLICABLE |
| 2 - SERVICE COMPONENTS LAYER | SERVICE COMPONENT | APPLICATION SERVER |
| | FUNCTIONAL COMPONENT | APPLICATION SERVER |
| | TECHNICAL COMPONENT | APPLICATION SERVER |
| | SUBSYSTEM | NOT APPLICABLE |
| 1 - OPERATIONAL SYSTEMS LAYER | EXISTING ASSET | NOT APPLICABLE |
| 6 - INTEGRATION LAYER | TECHNICAL COMPONENT | APPLICATION SERVER |
| 6 - INTEGRATION LAYER INTERSECTION WITH 3 - SERVICE LAYER | SERVICE | ENTERPRISE SERVICE BUS |
| | COMPOSITE SERVICE | ENTERPRISE SERVICE BUS |
| 7 - QoS LAYER | TECHNICAL COMPONENT | APPLICATION SERVER |
| 8 - DATA ARCH & BUSINESS INTELLIGENCE LAYER | TECHNICAL COMPONENT | APPLICATION SERVER |
| 8 - DATA ARCH & BUSINESS INTELLIGENCE LAYER INTERSECTION WITH 3- SERVICES LAYER | KPI | BUSINESS PERFORMANCE MONITORING |
| | BUSINESS ENTITY | DATABASE SERVER |
| | SERVICE MESSAGE | NOT APPLICABLE |
| 9 - GOVERNANCE LAYER | TECHNICAL COMPONENT | APPLICATION SERVER |
| 9 - GOVERNANCE LAYER INTERSECTION WITH 4 - BUSINESS PROCESS LAYER | BUSINESS GOAL | BUSINESS PERFORMANCE MONITORING |
| | RULE TYPE | BUSINESS RULES ENGINE |
| | BUSINESS RULE | BUSINESS RULES ENGINE |
| 9 - GOVERNANCE LAYER INTERSECTION WITH 3- SERVICE LAYER | SERVICE | SERVICE REGISTRY |
| | COMPOSITE SERVICE | SERVICE REGISTRY |

FIG. 2

OPERATIONAL MODEL CREATION FROM SOA SOLUTION ARCHITECTURE

BACKGROUND

The present invention relates to service oriented architecture (SOA) and, more particularly, relates to SOA solution architecture and a method to create an operational model from the SOA solution architecture.

SOA is a flexible set of design principles used during the phases of systems development and integration in computing. A system based on an SOA will package functionality as a suite of interoperable services that can be used within multiple, separate systems from several business domains.

Service-orientation requires loose coupling of services with operating systems, and other technologies that underlie applications. SOA separates functions into distinct units, or services, which developers make accessible over a network in order to allow users to combine and reuse them in the production of applications. These services and their corresponding consumers communicate with each other by passing data in a well-defined, shared format, or by coordinating an activity between two or more services.

BRIEF SUMMARY

The various advantages and purposes of the exemplary embodiments as described above and hereafter are achieved by providing, according to a first aspect of the exemplary embodiments, a method for the creation of an operational model from a service oriented architecture (SOA) solution architecture. The method includes: selecting an SOA solution architecture model from a plurality of SOA solution architecture models including a plurality of layers; retrieving at least one layer according to the SOA solution architecture model; retrieving at least one SOA model element corresponding to the at least one layer; searching for an operational model element type for the at least one SOA model element and reading the operational model element type; reading a technical environment including hardware and operating system requirements for the operational model element type; creating an operational model element with the technical environment hardware, operating system, and software product requirements; and generating an operational model including the customer specific hardware and software infrastructure required to deploy the SOA solution architecture solution. The method is performed on one or more computing devices.

According to a second aspect of the exemplary embodiments, there is provided a method for the creation of an operational model from a service oriented architecture (SOA) solution architecture. The method includes: selecting at least one SOA solution architecture model from a plurality of SOA solution architecture models including a plurality of layers; retrieving a plurality of layers according to the SOA solution architecture model; retrieving a plurality of SOA model elements corresponding to the layers; searching for a plurality of operational model element types corresponding to the plurality of SOA model elements and reading the operational model element types; reading a technical environment including hardware, operating system and software product requirements for the operational model element types; creating operational model elements with the technical environment hardware, operating system and software product requirements; and generating an operational model including the customer specific hardware and software infrastructure required to deploy the SOA solution architecture solution. The method is performed on one or more computing devices.

According to a third aspect of the exemplary embodiments, there is provided a non-transitory computer program product for creation of an operational model from a service oriented architecture (SOA) solution architecture. The computer program product includes a computer readable storage medium having computer readable program code embodied therewith. The computer readable program code includes: computer readable program code configured to select at least one SOA solution architecture model from a plurality of SOA solution architecture models including a plurality of layers; computer readable program code configured to retrieve at least one layer according to the SOA solution architecture model; computer readable program code configured to retrieve at least one SOA model element corresponding to the at least one layer; computer readable program code configured to search for an operational model element type for the at least one SOA model element and reading the operational model element type; computer readable program code configured to read a technical environment including hardware, operating system and software product requirements for the operational model element type; computer readable program code configured to create an operational model element with the technical environment hardware, operating system and software product requirements; and computer readable program code configured to generate an operational model including the customer specific hardware and software infrastructure required to deploy the SOA solution architecture solution.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 2 is a table illustrating an example of mapping a SOA solution architecture to an operational model.

DETAILED DESCRIPTION

Figure 1:
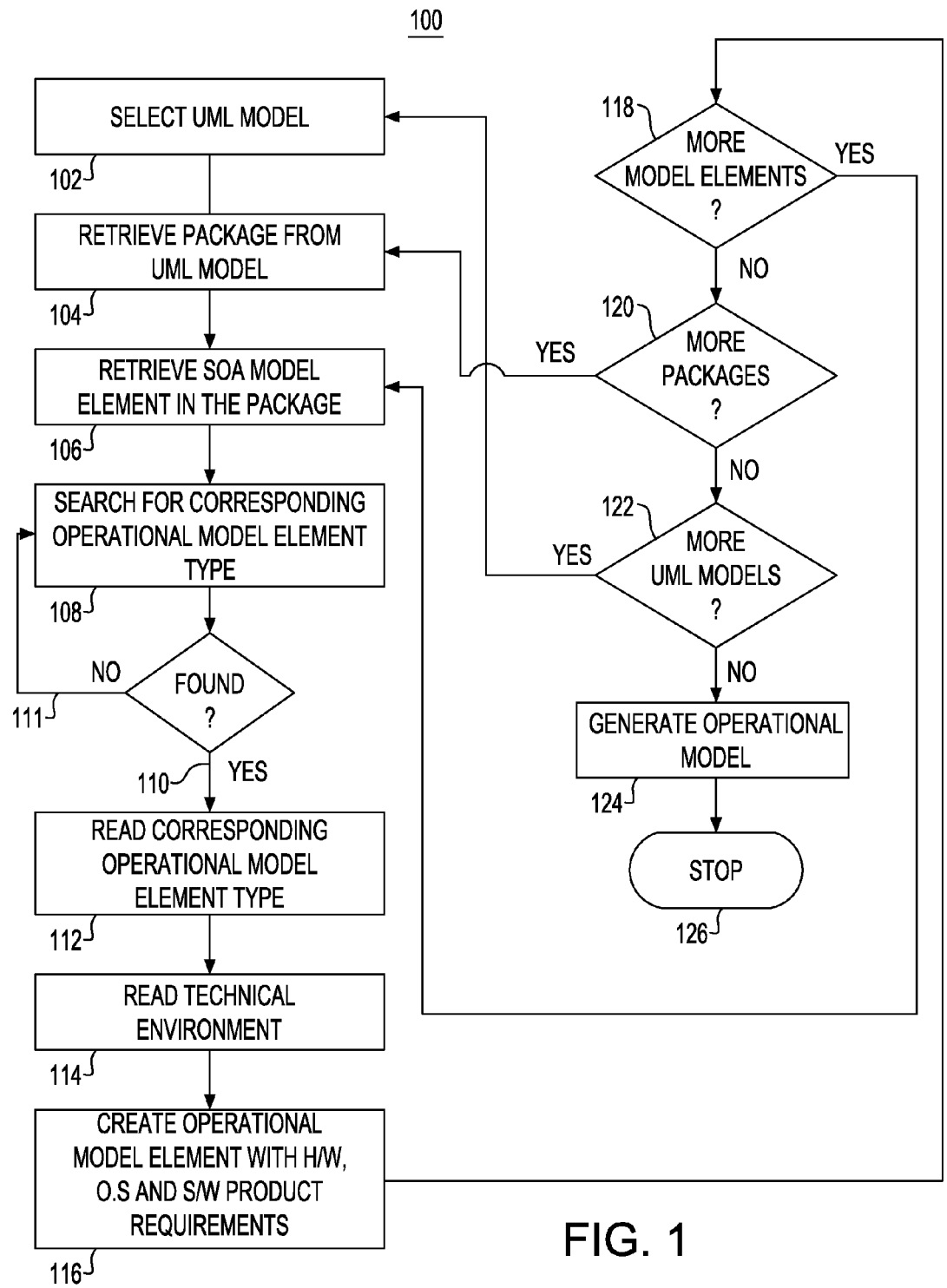
FIG. 1 is a flow chart illustrating the exemplary embodiments.

SOA solution architecture may be envisioned as a nine layered architectural view of SOA solutions. The nine layered architectural view has been proposed as a standard for SOA solution architecture by The Open Group which is a vendor and technology-neutral industry consortium, currently with several hundred member organizations.

These nine layers that make up the SOA solution architecture include the operational systems layer, service components layer, services layer, business process layer, consumer layer, integration layer, quality of service layer, data architecture and business intelligence layer and governance layer. Each of these layers will be further described below.

The operational systems layer captures the new and existing organization infrastructure needed to support the SOA solution. The operational systems layer may include all infrastructures to run the SOA and its components, all operational and runtime hosting of underlying systems components, both physical and infrastructural, and all assets required to support the functionality of the service in the SOA, including custom or packaged application assets, new services, services created through composition or orchestration, infrastructure services, etc.

The service components layer contains software components, each of which provide the implementation or "realization" for a service, or operation on a service; hence the name Service Component. Service components reflect the definition of the service they represent, both in its functionality and its quality of service. They "bind" the service contract to the implementation of the service in the operational systems layer. Service components are hosted in containers which support a service specification.

The services layer consists of all the services defined within the SOA. The services layer can be thought of as containing the service descriptions (design time and business architectural assets, as well as runtime service contract descriptions) and the container for implementing the services.

The business process layer defines the compositions and choreographies of services exposed in the services layer. In a service oriented world, business capabilities are realized by business processes, or collections of business processes. These business processes include service orchestrations and compositions, and the ability to insert "human intervention" and support long-lived transactions.

The consumer layer provides the capabilities required to deliver information technology functions and data to end-users that meet specific usage preferences through channels, portals, rich clients as well as being an interface for application to application communication, and to other services and channels. The consumer layer provides the capability to quickly create the front end of the business processes and composite applications to respond to changes in the marketplace.

The integration layer is a key enabler for an SOA as it provides the capability to mediate, transform, route and transport service requests from the service requester to the correct service provider. The integration that occurs here is primarily the integration of the service components layer, the services layer and the business process layer.

The quality of service layer provides the SOA solution architecture lifecycle processes with the capabilities required to ensure that the defined policies and nonfunctional requirements are adhered to.

The data architecture and business intelligence layer includes information architecture, business intelligence, meta-data considerations and ensures the inclusion of key considerations pertaining to data architecture and information architectures that can also be used as the basis for the creation of business intelligence through data marts and data warehouses.

The governance layer ensures that the services and SOA solutions within an organization are adhering to the defined policies, guidelines and standards that are defined as a function of the objectives, strategies and regulations applied in the organization.

The present exemplary embodiments propose a method of taking an SOA solution architecture and creating an operational model. A service oriented modeling and architecture method facilitates the creation of the operational model from the SOA solution architecture.

Service oriented modeling and architecture (SOMA) is an end-to end SOA development method aimed at enabling target business processes through the identification, specification, realization, implementation, and deployment of business-aligned services, components that realize those services (also referred to as "service components"), and flows that can be used to compose services, collectively referred to as SOA model elements.

Each of the SOA solution architecture layers may be modeled using SOA model elements. From each of the SOA model elements may be modeled an operational model element.

An operational model is the infrastructure required to deploy the SOA solution architecture solution. The infrastructure may include the specific hardware and software customer requirements, that is, the operational model elements, to implement the SOA solution architecture solution.

More formally, an operational model defines and documents the distribution of an information technology system's components on to geographically distributed nodes, together with the connections necessary to support the required component interactions, in order to achieve the information technology system's functional and non-functional requirements within the constraints of technology, skills and budget.

There is no current method to create the operational model from the SOA solution architecture. Conventionally, the operational model is created independently from the SOA solution architecture which means that there might not be the best fit between the customer specific SOA solution architecture solution and the operational model. In the exemplary embodiments, it is ensured that every element in the SOA solution architecture appears in the operational model.

Figure 3:
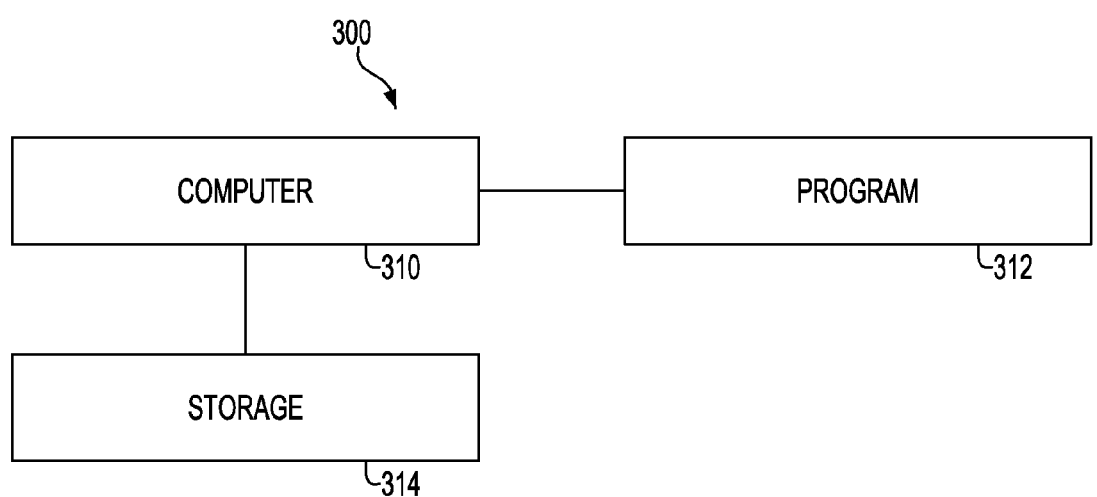
FIG. 3 is a block diagram illustrating a hardware environment for the exemplary embodiments.

The program environment in which the exemplary embodiments may be executed illustratively incorporates a general-purpose computer or a special purpose device such as a hand-held computer. FIG. 3 is a block diagram that illustrates one exemplary hardware environment of a system 300 for practicing the exemplary embodiments. The exemplary embodiments may be implemented using a computer 310 comprised of microprocessor means, random access memory (RAM), read-only memory (ROM) and other components. The computer may be a personal computer, mainframe computer or other computing device. Resident in the computer 310, or peripheral to it, will be a storage device 314 of some type such as a hard disk drive, floppy disk drive, CD-ROM drive, tape drive or other storage device.

Generally speaking, the software implementation of the exemplary embodiments, program 312 in FIG. 3, is tangibly embodied in a computer-readable medium such as one of the storage devices 314 mentioned above. The program 312 comprises instructions which, when read and executed by the microprocessor of the computer 310 causes the computer 310 to perform the steps necessary to execute the steps or elements of the exemplary embodiments.

Referring now to FIG. 1, there is illustrated a process 100 for practicing the exemplary embodiments. The process 100 begins by a user selecting a UML model, box 102. The SOA solution architecture may be stored as one or more UML models. There may be tens or hundreds of UML models stored in a user's computer. The user may select one or more appropriate UML models based on the scope and complexity of the SOA solution architecture solution.

Unified Modeling Language (UML) is a standardized general-purpose modeling language in the field of software engineering. The standard is managed, and was created by, the Object Management Group (OMG). UML includes a set of graphic notation techniques to create visual models of software-intensive systems. A UML model is an abstract model of a specific system and may consist of elements such as packages, classes, and associations.

SOA solution architecture is typically represented as a UML model using UML notation or equivalent representation. While UML models have been utilized in the exemplary embodiments, it should be understood that other representations like ontology may be used for the SOA solution architecture.

Every selected UML model is passed on to the next steps for processing.

In a next step, a package corresponding to an SOA solution architecture layer is retrieved from the UML model, box 104.

The package corresponding to SOA Solution Architecture layer is passed on to the next steps for processing.

Next, the system 300 retrieves an SOA model element from the UML package corresponding to the SOA solution architecture layer, box 106. A SOA model element is retrieved from the UML package from the previous step, box 104

Every SOA model element is passed on to the next steps for processing.

The system 300 searches for an operational model element type corresponding to the SOA model element, box 108, in a configuration file. The operational model element type is a value coming from the configuration file. If a corresponding operational model element type is found, branch 110, the process 100 proceeds to the next step. If a corresponding operational element type is not found, branch 111, the process 100 proceeds back to process the next model element, box 108.

In the next process step, the system 300 then reads the operational model element type previously found corresponding to the SOA model element, box 112. "Reading" is a simple I/O operation used to read the values from, for example, a configuration file. The system 300 will read an operational model element type for the given SOA Model Element. In this way, an operational model element type may be mapped to the SOA model element. The operational model element type may be modeled using a program such as IBM's Rational Software Architect/Modeler. The operational model element type may be modeled also using other programs such as Sparx Systems Enterprise Architect. The operational model element type may be, for example, a generic software product such as an application server.

The system 300 then reads customer specific technical environment information for the operational model element type, box 114. In the previous process step, an application server was identified. In the present process step, the application server may be, for example, more specifically identified as an IBM WebSphere application server to comply with the technical environment information from the customer.

Thereafter, the system 300 creates an operational model element with the customer specific technical environment information, box 116. This process step essentially combines the result of the previous two process steps of reading an operational model element type, box 112, and reading customer specific technical environment information, box 114, to result in the creation of an operational model element meeting the customer's technical requirements.

Thus, the process 100 has processed one SOA model element for one package (layer) of the UML model. There may be more SOA model elements to consider. In a next process step, the system 300 checks for additional SOA model elements, box 118. If there are additional SOA model elements, the process 100 proceeds back to retrieve the next SOA model element, box 106, and then continues from there to search for corresponding operational model element types, box 108, and so on. If there are no more SOA model elements, the process 100 proceeds to the next process step.

The system checks for additional packages (layers), box 120. That is, every UML package corresponding to the SOA solution architecture layers is processed. The next package is passed to the next step for processing, retrieving SOA model elements in the package, box 106. Assuming there are nine layers in every SOA solution architecture, every UML package is processed through the process 100 nine times. If there are additional packages, the process 100 proceeds back to retrieve elements in the UML package corresponding to the SOA solution architecture layer, box 104. If there are no more packages, the process 100 proceeds to the next process step.

The system checks for additional UML models, box 122, applicable to the SOA solution architecture. If there are additional UML models, the process 100 proceeds back to select UML model, box 102. If there are no more UML models, the system generates the operational model, box 124.

The process 100 then stops, box 126.

The exemplary embodiments establish mapping between SOA Solution Architecture Layers, SOA model elements and Operational Model elements.

FIG. 2 is a hypothetical illustration of the mapping between the SOA solution architecture layer, the SOA model element and the operational model element. It is noted that some of the SOA model elements do not have corresponding operational model elements. The exemplary embodiments take this factor into account by searching for operational model element types that correspond with SOA model elements, box 108 (FIG. 1) before proceeding any further with the process 100.

As will be appreciated by one skilled in the art, aspects of the exemplary embodiments may be embodied as a system, method, service method or computer program product. Accordingly, aspects of the exemplary embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the exemplary embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the exemplary embodiments may be written in any combination of one or more programming languages, including an object oriented programming language such as Java, Smalltalk, C++ or the like and conventional procedural programming languages, such as the "C" programming language or similar programming languages or even Microsoft Excel/Access. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the exemplary embodiments have been described above with reference to flowchart illustrations and/or block diagrams of methods, apparatus (systems) and computer program products according to the exemplary embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods, service methods and computer program products according to the exemplary embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method for the creation of an operational model from a service oriented architecture (SOA) solution architecture comprising:

selecting an SOA solution architecture model from a plurality of SOA solution architecture models wherein the selected SOA solution architecture model includes a plurality of layers;

retrieving at least one layer according to the SOA solution architecture model;

retrieving at least one SOA model element corresponding to the at least one layer;

searching for an operational model element type for the at least one SOA model element and reading the operational model element type to map the SOA model element to the operational model element type wherein the operational model element type comprises a generic software product;

reading technical environment information including hardware, operating system and software product requirements for the operational model element type to identify a specific software product for the generic software product for the operational model element type;

creating an operational model element with the technical environment information including hardware, operating system and software product requirements wherein the operational model element comprises a hardware product having the hardware, operating system and specific software product requirements identified for the operational model element type;

generating an operational model from the operational model element including the specific hardware and software infrastructure required to deploy the SOA solution architecture model; and repeating the method for additional SOA model elements so that there is a plurality of operational model element types corresponding to the additional SOA model elements and including generating the operational model from the plurality of operational model elements including the specific hardware and software infrastructure required to deploy the SOA solution architecture model:

wherein the method is performed on one or more computing devices.

2. The method of claim 1 wherein the SOA solution architecture model is a unified modeling language (UML) model.

3. The method of claim 1 further comprising repeating the method for any additional SOA Solution Architecture layers.

4. The method of claim 1 further comprising repeating the method for at least one additional SOA solution architecture model.

5. The method of claim 1 wherein the SOA solution architecture is a nine layered architectural view of an SOA solution.

6. A method for the creation of an operational model from a service oriented architecture (SOA) solution architecture comprising:
   selecting at least one SOA solution architecture model from a plurality of SOA solution architecture models wherein the selected SOA solution architecture model includes a plurality of layers;
   retrieving a plurality of layers according to the SOA solution architecture model;
   retrieving a plurality of SOA model elements corresponding to the plurality of layers;
   searching for an operational model element type corresponding to each of the plurality of SOA model elements resulting in a plurality of operational model element types and reading the plurality of operational model element types to map the plurality of SOA model elements to the plurality of operational model element types wherein each of the operational model element types comprises a generic software product;
   reading technical environment information including hardware, operating system and software product requirements for the plurality of operational model element types to identify a specific software product for the generic software product for each of the plurality of operational model element type;
   creating operational model elements corresponding to the plurality of SOA model elements from the plurality of operational model element types with the technical environment information including hardware, operating system and software product requirements wherein the operational model elements comprise hardware products having the hardware, operating system and specific software product requirements identified for the operational model element types; and
   generating an operational model from the operational model elements including the specific hardware and software infrastructure required to deploy the SOA solution architecture model;
   wherein the method is performed on one or more computing devices.

7. The method of claim 6 wherein the SOA solution architecture model is a unified modeling language (UML) model.

8. The method of claim 6 wherein the SOA solution architecture is a nine layered architectural view of an SOA solution.

9. A non-transitory computer program product for creation of an operational model from a service oriented architecture (SOA) solution architecture, the computer program product comprising:
   a computer readable storage medium having computer readable program code embodied therewith, the computer readable program code comprising:
   (a) computer readable program code configured to select at least one SOA solution architecture model from a plurality of SOA solution architecture models wherein the selected SOA solution architecture model includes a plurality of layers;
   (b) computer readable program code configured to retrieve at least one layer according to the SOA solution architecture model;
   (c) computer readable program code configured to retrieve at least one SOA model element corresponding to the at least one layer;
   (d) computer readable program code configured to search for an operational model element type for the at least one SOA model element and read the operational model element type to map the SOA model element to the operational model element type wherein the operational model element type comprises a generic software product;
   (e) computer readable program code configured to read a-technical environment information including hardware, operating system and software product requirements for the operational model element type to identify a specific software product for the generic software product for the operational model element type;
   (f) computer readable program code configured to create an operational model element with the technical environment information including hardware, operating system and software product requirements wherein the operational model element comprises a hardware product having the hardware, operating system and specific software product requirements identified for the operational model element type; and
   (g) computer readable program code configured to generate an operational model from the operational model element including the specific hardware and software infrastructure required to deploy the SOA solution architecture model.

10. The non-transitory computer program product method of claim 9 wherein the SOA solution architecture model is a unified modeling language (UML) model.

11. The non-transitory computer program product method of claim 9 further comprising computer readable program code configured to repeat (c) to (g) for additional SOA model elements to result in a plurality of SOA model elements so that a plurality of operational model element types are created corresponding to the plurality of SOA model elements.

12. The non-transitory computer program product method of claim 9 further comprising computer readable program code configured to repeat (b) to (g) for any additional layers.

13. The non-transitory computer program product method of claim 9 further comprising computer readable program code configured to repeat (a) to (g) for at least one additional SOA solution architecture model.

14. The non-transitory computer program product method of claim 9 wherein the SOA solution architecture is a nine layered architectural view of an SOA solution.

* * * * *